United States Patent Office 2,857,860
Patented Oct. 28, 1958

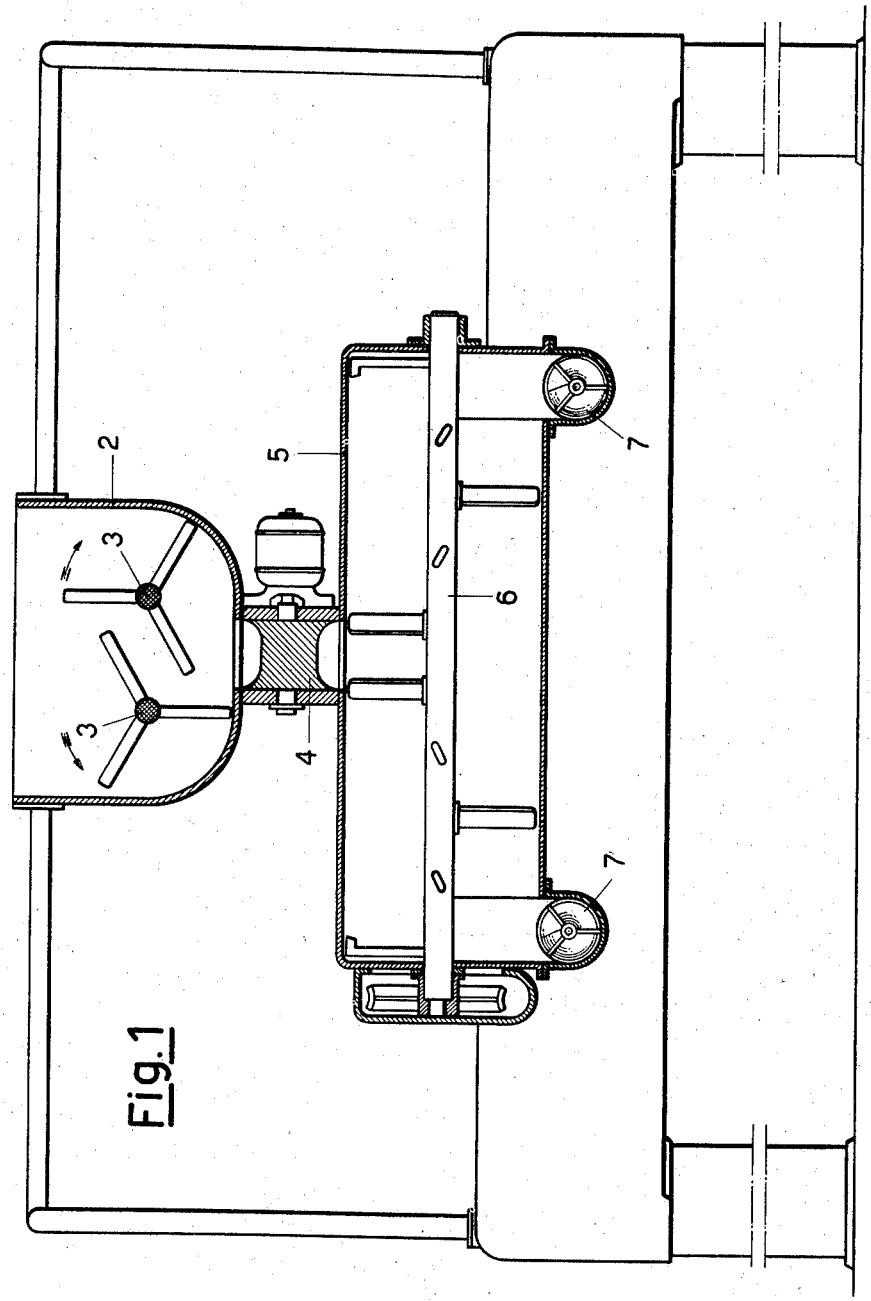

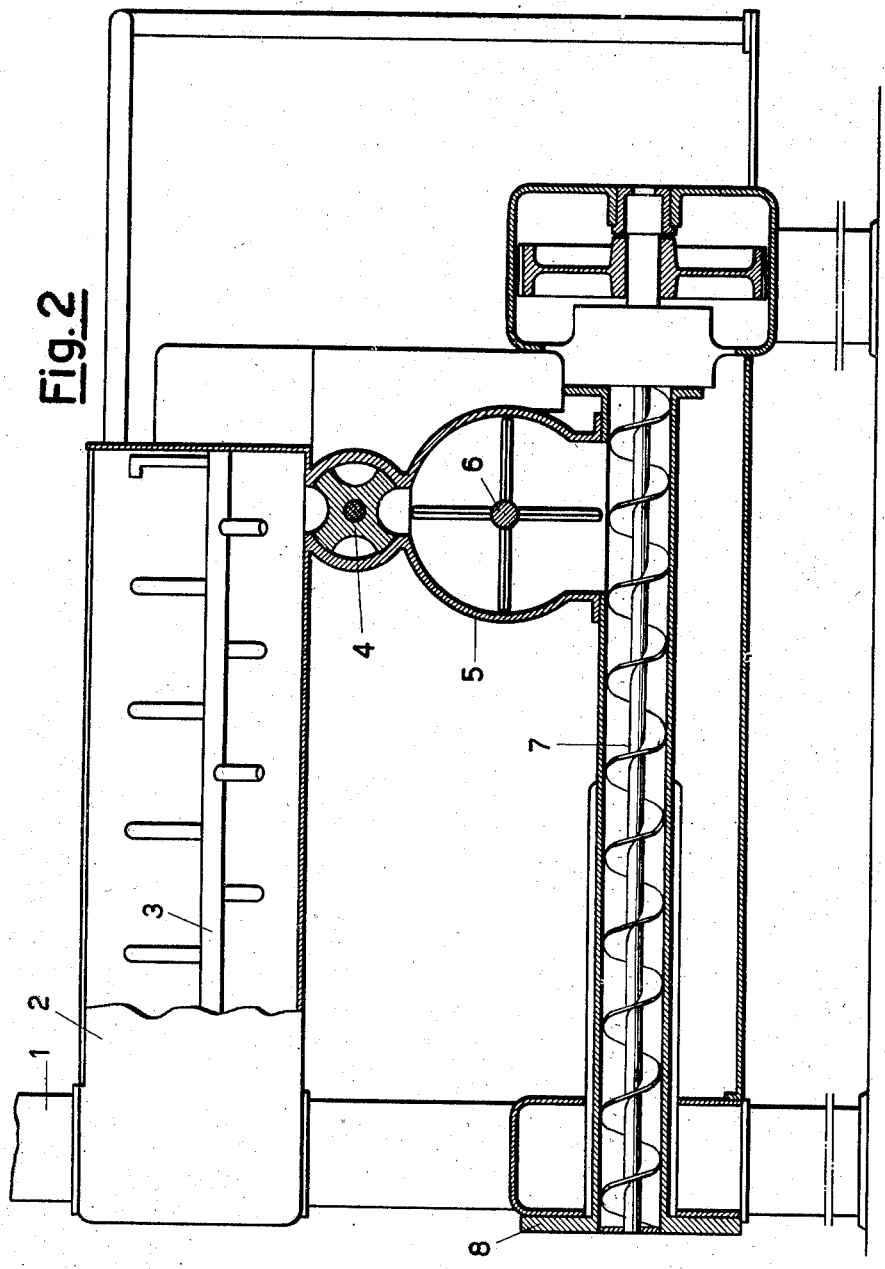

2,857,860

AUTOMATIC MACHINE FOR THE CONTINUOUS PRODUCTION OF ALIMENTARY PASTES

Mario Braibanti and Giuseppe Braibanti, Milan, Italy

Application March 21, 1957, Serial No. 647,713

Claims priority, application Italy March 24, 1956

1 Claim. (Cl. 107—31)

This invention relates to automatic machines for the continuous production of alimentary pastes.

In recent years, there has been an increased consumption of alimentary pastes having the shape of skeins of filaments. These skeins are produced by special machines called skeiners which form the skeins from long filaments of paste or from sheets of dough extruded by automatic equipment.

There are various types of known equipment which are employed for producing skeins at acceptable rates of production. One of the more satisfactory types of skein producing machine is the automatic type of machine for the simultaneous feeding of two or more skeiners with alimentary paste.

A particular type of automatic machine within the above indicated category is the type of machine wherein a T-pipe or a V-pipe is used to feed a twin head through which the alimentary paste is passed.

Some of the problems involved in the above indicated method of producing skeins relate to the production of skeins simultaneously, which skeins are preferably produced with the same characteristics such as color and the like.

It is accordingly an object of the invention to provide an improved device for producing extruded alimentary pastes. More particularly, it is an object of the invention to provide improved means for feeding extruding heads simultaneously with alimentary paste having homogeneous characteristics.

In achieving the above and other of its objectives, the invention contemplates the provision of a machine having an air-tight mixing trough in which a shaft is provided having mixing blades symmetrically positioned as will be shown for feeding two symmetrically arranged pressing screws which feed associated extruding heads.

A preferred embodiment of the invention will next be explained in greater detail with reference to the accompanying drawing in which:

Fig. 1 is a cross-sectional view of an automatic machine provided in accordance with the preferred embodiment of the invention;

Fig. 2 is a longitudinal section of the machine illustrated in Fig. 1.

In the drawing are shown a device 1 for measuring water and solid ingredients (flour and so forth), and a mixing bin 2 wherein rotate two vaned shafts 3 which are symmetrical and symmetrically arranged. At the end of the bin 2, in a central position with respect to the two shafts 3 there is provided a rotary valve 4 controlling the descent of the dough in air-tight manner to a trough or chamber 5 wherein a partial vacuum is maintained by a conventional suction fan (not shown). In the chamber 5 rotates a shaft 6 which is equipped with vanes arranged symmetrically with respect to a radial plane of the valve 4. At equal distance from this plane, there are provided two compression screws 7 parallel to each other and perpendicular to the shaft 6, screws 7 receiving the dough in equal quantities from the chamber 5 and compressing the dough towards the respective heads 8 provided with rectangular or circular strainers. With the system of symmetrical distribution of dough as provided in the vacuum chamber, the compression screws are each supplied with dough having like characteristics with no possible imbalance of pressure as would occur if a single machine were to be used to feed dough to two heads by way of a T or V pipe.

We claim:

A machine for producing extruded alimentary paste comprising an air tight mixing trough, a shaft provided with mixing blades rotatably mounted in said trough defining a longitudinal axis, said blades being symmetrically positioned with respect to a transverse plane passing through the mid-point of the longitudinal axis of the trough, two pressing screws symmetrical in shape and symmetrically positioned in parallel relation to the said transverse plane, each of said screws being located at the opposite ends of said trough to be fed thereby, and an air lock transfer device for feeding flour and water to the middle of said trough.

References Cited in the file of this patent

UNITED STATES PATENTS

| 509,987 | Wilcox | Dec. 5, 1893 |
| 710,619 | Sharpless | Oct. 7, 1902 |
| 939,392 | Chambers | Nov. 9, 1909 |
| 1,538,450 | Stewart | May 19, 1925 |
| 2,078,565 | Durst | Apr. 27, 1937 |

FOREIGN PATENTS

| 478,017 | Italy | Feb. 12, 1953 |
| 568,094 | Great Britain | Mar. 19, 1945 |
| 1,124,068 | France | Oct. 3, 1956 |